US008786775B2

(12) United States Patent
Chung

(10) Patent No.: US 8,786,775 B2
(45) Date of Patent: Jul. 22, 2014

(54) DISPLAY SYSTEM AND METHOD OF OUTPUTTING IMAGE SIGNAL CORRESPONDING TO DISPLAY PANEL

(75) Inventor: Yong-Jun Chung, Seongnam-si (KR)

(73) Assignee: Humax Co., Ltd., Gyeonggi-do (KR)

( * ) Notice: Subject to any disclaimer, the term of this patent is extended or adjusted under 35 U.S.C. 154(b) by 1266 days.

(21) Appl. No.: 11/624,126

(22) Filed: Jan. 17, 2007

(65) Prior Publication Data

US 2007/0171242 A1 Jul. 26, 2007

(30) Foreign Application Priority Data

Jan. 25, 2006 (KR) ........................ 10-2006-0007860

(51) Int. Cl.
*H04N 7/01* (2006.01)
*H04N 11/20* (2006.01)

(52) U.S. Cl.
USPC ............ 348/445; 348/556; 348/558; 345/1.1; 345/3.1; 345/3.4; 345/698

(58) Field of Classification Search
USPC .............. 348/445, 556, 558; 345/1.1, 3.1, 3.4
See application file for complete search history.

(56) References Cited

U.S. PATENT DOCUMENTS

| | | | | |
|---|---|---|---|---|
| 7,224,404 | B2 * | 5/2007 | An et al. | 348/584 |
| 7,958,537 | B2 * | 6/2011 | Baek et al. | 725/139 |
| 2004/0090556 | A1 * | 5/2004 | Kamieniecki et al. | 348/558 |
| 2005/0024535 | A1 * | 2/2005 | Tatemori et al. | 348/445 |
| 2005/0225677 | A1 * | 10/2005 | Choi | 348/569 |
| 2006/0010259 | A1 * | 1/2006 | Kang et al. | 710/1 |
| 2006/0017844 | A1 * | 1/2006 | Iwaki | 348/445 |

* cited by examiner

*Primary Examiner* — Jefferey Harold
*Assistant Examiner* — Omer Khalid
(74) *Attorney, Agent, or Firm* — Baker Botts L.L.P.

(57) ABSTRACT

Provided are a display system and a method of outputting an image signal corresponding to a display panel. The display system includes an image processor converting original video data input from a video signal converting unit into converted video data corresponding to a recognized output standard and outputting the converted video data; and a display unit including a memory storing characteristic information and serving to display the converted video data as visual information. Here, the image processor reads out the characteristic information from the memory to recognize the output standard. Accordingly, it is possible to adaptively cope with the case where only the display panel is replaced for the purpose of improvement in resolution, etc.

14 Claims, 3 Drawing Sheets

DISPLAY SYSTEM AND METHOD OF OUTPUTTING IMAGE SIGNAL CORRESPONDING TO DISPLAY PANEL

BACKGROUND

1. Technical Field

The present invention relates to an image display system, and more particularly, to an image processor and a method of outputting an image signal corresponding to a display panel.

2. Background Art

In general, displays such as a liquid crystal display (LCD) and a plasma display panel (PDP) are used to display an image in a variety of fields such as televisions and computer monitors. Such a display receives horizontal synchronization signals (Hsync), vertical synchronization signals (Vsync), and image signals of red (R), green (G), and blue (B) from an image processor and displays an image.

FIG. 1 is a block diagram schematically illustrating a known display system.

Referring to FIG. 1, the known display system includes a video signal converting unit 110, an image processor 120, a display unit 130, a video reproducing unit 140, and a control unit 150. The display system may further include an input unit, an OSD (On Screen Display) processing unit, a power supply unit, and a tuner, but these elements are not related to the gist of the invention and thus will not be described.

The video signal converting unit 110 converts input analog video data into digital video data and outputs the digital video data.

The image processor 120 converts the digital video data converted by the video signal converting unit 110 to comply with an output standard (such as resolution, vertical frequency, and screen ratio) of the display unit 130 and inputs the converted digital video data to the display unit 130. The output standard with which the image processor 120 converts the digital video data is determined and fixed in advance.

The display unit 130 displays the digital video data input from the image processor 120 as visual information. The display unit 130 may include a memory for temporarily storing the digital video data to reproduce the digital video data.

The video reproducing unit 140 converts video data having a predetermined format (such as video data coded with MPEG-2 format and stored in a memory (not shown) or received through a communication module (not shown)) into digital video data which can be processed by the image processor 120 and inputs the converted digital video data to the image processor 120.

The control unit 150 controls operations of the elements of the display system. For example, the control unit 150 can control the image processor 120, the display unit 130, and the like to change a display state of an image displayed on the display unit 130 on the basis of predetermined variables.

As described above, in the known display system, information on the output standard (such as resolution) with which the digital video data should be output is fixedly determined by the image processor 120 or the control unit 150 in advance.

In this case, when it is not necessary to replace the display unit 130, for example, a display panel, the display system can be operated without particular problems.

However, when the display panel is replaced with a display panel having a new output standard (such as resolution) for the purpose of improvement of the display system, there is a limit that the new output standard cannot be automatically applied by the elements of the display system. Accordingly, when the display panel is replaced with a new one, a user should update a firmware of the image processor 120 or change the setting details of the control unit 150.

SUMMARY

The present invention is contrived to solve the above-mentioned problems. An advantage of some aspects of the invention is that it provides a display system which can adaptively cope with the replacement of only a display panel for the purpose of improvement in resolution, etc. and a method of outputting an image signal corresponding to a display panel.

Another advantage of some aspects of the invention is that it provides a display system which can be provided with proper information on an output standard from a display panel and a method of outputting an image signal corresponding to a display panel.

Other advantages of the invention will be easily understood from the following description of exemplary embodiments of the invention.

According to an aspect of the invention, there is provided a display system including an image processor and a display unit.

The display system includes: an image processor converting original video data input from a video signal converting unit into converted video data corresponding to a recognized output standard and outputting the converted video data; and a display unit including a memory storing characteristic information and serving to display the converted video data as visual information. Here, the image processor reads out the characteristic information from the memory to recognize the output standard.

The image processor may read out the characteristic information from the memory only when an interface for accessing the memory is set.

The output standard may include one or more of a resolution, a screen ratio, and a vertical frequency.

The memory may be a non-volatile memory.

The recognition of the output standard may be performed only at the time of being first coupled to the display unit or only at the time of first receiving continuous original video data.

According to another aspect of the invention, there is provided a method of outputting an image signal, which is executed by a display system, and a recording medium having a program for executing the method recorded thereon.

The method of outputting an image signal in the image processor of the display system having the image processor and a display unit includes: (a) reading out an output standard from a memory included in the display unit; and (b) outputting converted video data corresponding to original video data input from a video signal converting unit to the display unit. The process of (b) includes: (c) generating the converted video data corresponding to the output standard by the use of the original video data input from the video signal converting unit; (d) outputting the generated converted video data to the display unit; and (e) repeating the processes of (c) and (d) until the input of the original video data from the video signal converting unit is finished.

A process of judging whether an interface for accessing the memory of the display unit is set may be previously performed. Here, the processes of (a) and (b) may be performed only when the interface is set.

The output standard may include one or more of a resolution, a screen ratio, and a vertical frequency.

The memory may be a non-volatile memory.

The process of (a) may be performed only at the time of being first coupled to the display unit or only at the time of first receiving continuous original video data.

DESCRIPTION OF THE EXEMPLARY EMBODIMENTS

Figure 1:
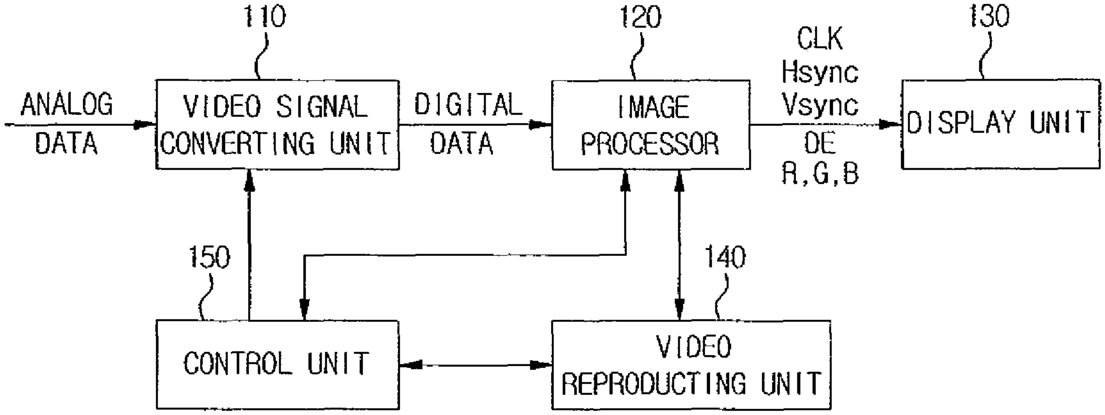
FIG. 1 PRIOR ART
FIG. 1 is a block diagram schematically illustrating a known display system.

Hereinafter, exemplary embodiments of the invention will be described in detail with reference to the attached drawings. For the purpose of easy understanding of the following description, like elements are denoted by like reference numerals regardless of the drawing numbers.

A display system according to the exemplary embodiments of the invention can be applied to all the display apparatuses for displaying image signals as visual information, such as a television and a computer monitor, without any restriction.

Figure 2:
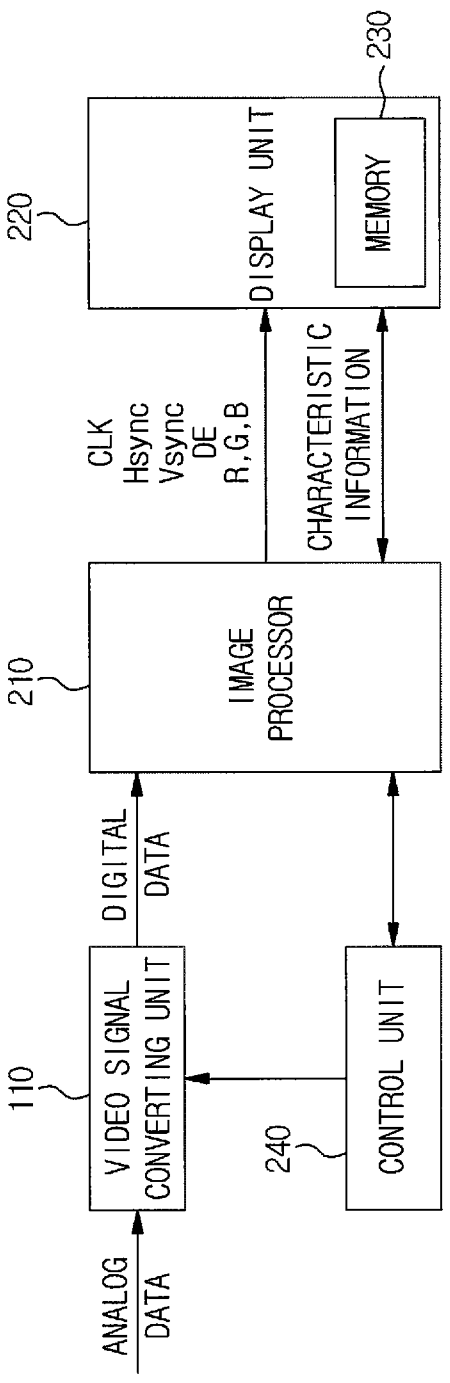
FIG. 2 is a block diagram schematically illustrating a display system according to an exemplary embodiment of the present invention.

FIG. 2 is a block diagram schematically illustrating a display system according to an exemplary embodiment of the invention.

Referring to FIG. 2, the display system according to an exemplary embodiment of the invention includes a video signal converting unit 110, an image processor 210, a display unit 220, and a control unit 240. The display system may further include an input unit, an OSD (On Screen Display) processing unit, a power supply unit, and a tuner, but these elements are not related directly to the gist of the invention and thus will not be described.

The video signal converting unit 110 converts input analog video data into digital video data and outputs the digital video data.

The image processor 210 converts the digital video data converted by the video signal converting unit 110 to comply with an output standard (such as resolution, vertical frequency, and screen ratio) of the display unit 220 and inputs the converted digital video data to the display unit 220.

The image processor 210 reads out characteristic information (for example, one or more of output standard and size) of the coupled display unit 220 from a memory unit 230 of the display unit 220.

An interface may be set between the image processor 210 and the display unit 220 by using pins so as for the image processor 210 to read out the characteristic information from the memory 230. The image processor 210 can check whether the display unit 220 is replaced, by periodically or non-periodically monitoring whether the interfaces is maintained. The maintenance of the interface may be monitored by using any method which has been developed or will be developed in the future, such as allowing the image processor 210 to output a state signal. This method is obvious to those skilled in the art and thus description thereof will be omitted. The image processor 210, of course, may determine the replacement of the display unit 220 on the basis of a reset of a circuit connection to the display unit 220.

Accordingly, when the pins are not formed in the display unit 220 and thus an interface is not set between the image processor 210 and the display unit 220, the image processor 210 can recognize that the coupled display unit 220 does not include the memory 230. In this case, the image processor 210 outputs an image signal based on a predetermined default characteristic information and then updates the characteristic information of the display unit 220 in accordance with a user's setting command from an input unit (not shown).

The image processor 210 may read out the characteristic information from the memory 230 at the time of being first connected to the display unit 220 and update information (such as output standard) managed by the image processor 210, or may read out the characteristic information from the memory 230 at the time of receiving first analog video data from the video signal converting unit 110 and update the information managed by the image processor 210. In this case, the image processor 210 can store and manage the characteristic information read out from the memory 230 in a memory area of the image processor 210 or a memory coupled to the image processor 210.

Among two above-mentioned embodiments for reading out the characteristic information, in the former, the reading of the characteristic information is performed only at the time of being coupled to a new display unit 220, but in the latter, the reading of the characteristic information is performed every time of starting the reproduction of the video signals.

Examples of the signal input from the image processor 210 to the display unit 220 can include a clock signal (CLK), a horizontal synchronization signal (Hsync), a vertical synchronization signal (Vsync), a data enable signal (DE) (signal indicating an active video period of the digital video data), and image signals of red (R), green (G), and blue (B).

The display unit 220 includes a display panel and a memory 230. The display panel 220 may further include a driver for displaying input video signals on the display panel as visual information (such as images). The display unit 220 can be embodied in various forms, for example, by a digital light processing (DLP) display, a liquid crystal display (LCD), or a plasma display panel. Here, when the display unit is embodied by the DLP, the driver of the display unit 220 can include an optical engine and when the display unit is embodied by the LCD, the display unit 220 can include a printed circuit board for converting video signals into data signals and gate signals. The display unit 220 can further include a memory for temporarily storing image signals input from the image processor 210 so as to display the image signals as visual information.

The memory 230 may be a non-volatile memory and stores the characteristic information corresponding to the display unit. The memory 230 may store the following characteristic information. The information pieces of the characteristic information are not limited to the following examples, but may be obviously embodied in various forms.

Display Area: 885.168 (H) mm×497.664 (V) mm

Outline Dimension: 950.0 (W) mm×5500 (H) mm×50.0 (D) mm (Typical Value)

Display Colors: 16.7 M (8 bits-true) colors

Number of Pixels: 1366×768 pixels (16:9)

Pixel Pitch: 0.648 (H) mm×0.216 (V) mm

Power Consumption: 150.0 Watt (BLU 140, Panel 10)

Weight: 10000 (TYP) g

The control unit 240 controls operations of the elements of the display system.

As described above, in the display system according to an exemplary embodiment of the invention, the information (such as resolution) on the output standard with which the digital video data should be output is stored in and managed by the memory 230 of the display unit. When the display unit 220 is replaced, the changed output standard can be applied in real time.

Figure 3:
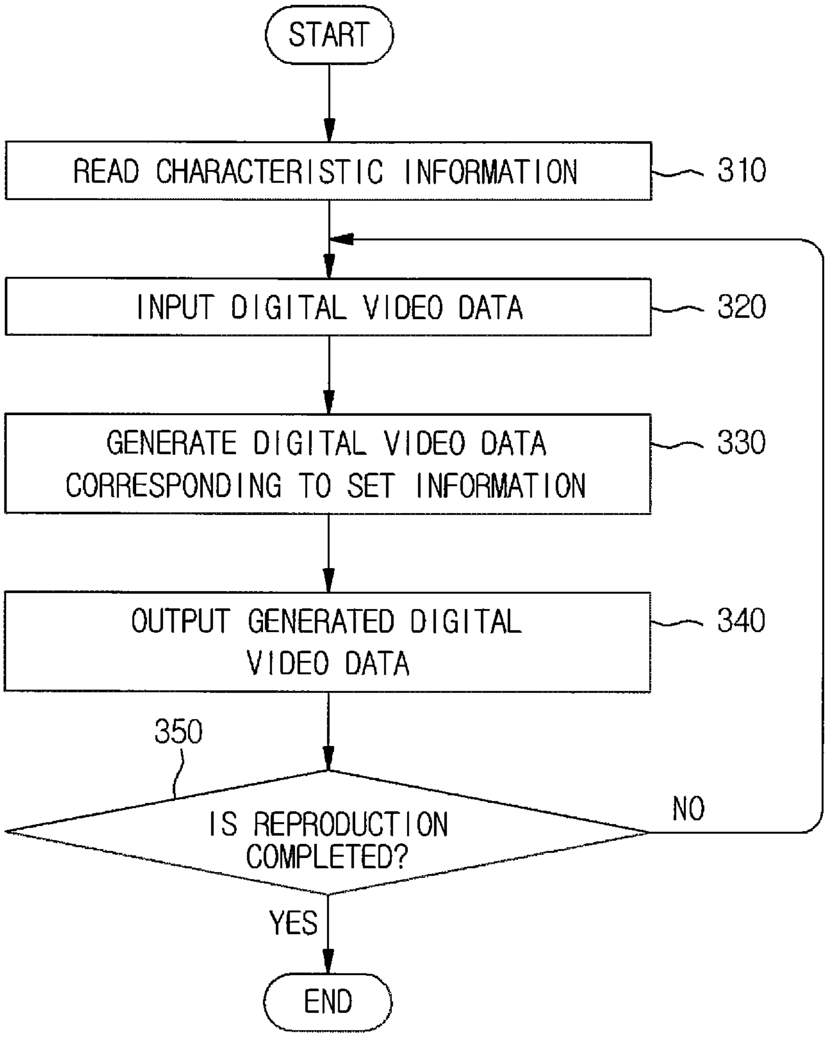
FIG. 3 is a flowchart illustrating a method of outputting an image signal according to an exemplary embodiment of the invention.

FIG. 3 is a flowchart illustrating a method of outputting an image signal according to an exemplary embodiment of the invention.

FIG. 3 illustrates a process of the image processor 210 outputting image information suitable for a new display unit 220 when the display unit 220 is replaced, where it is assumed that the memory 230 is provided in the display unit 220.

Accordingly, prior to the processes shown in FIG. 3, a process of judging whether an interface for reading out the characteristic information is formed between the image processor 210 and the display unit 230 so as to judge whether the memory 230 is included in the display unit 220 will be performed.

When the interface is not formed, as described above, the image processor 220 outputs image information corresponding to default characteristic information to the display unit 230. The default characteristic information can be updated by means of a user's operation of an input unit.

In the following description, it is assumed that the memory 230 is included in the display unit 220, as shown in FIG. 3.

Referring to FIG. 3, in step 310, the image processor 210 accesses the memory 230 included in the display unit 220 and reads out the characteristic information. It is obvious that only the information corresponding to the output standard among the characteristic information can be selectively read out. As described above, the image processor 210 may read out the characteristic information from the memory 230 at the time of being first coupled to the display unit 220 and update the information managed by the image processor 210, or may read out the characteristic information from the memory at the time of receiving first analog video data from the video signal converting unit 110 and update the information managed by the image processor 210. Since the structure and method of allowing the image processor 210 to read out the corresponding information from the memory 230 is obvious to those skilled in the art, description thereof will be omitted.

In step 320, the image processor 210 receives digital video data from the video signal converting unit 110.

In step S330, the image processor 210 generates digital video data corresponding to the output standard on the basis of the received digital video data. Since the method of generating digital video data corresponding to the determined output standard is obvious to those skilled in the art, description thereof will be omitted.

In step 340, the image processor 210 inputs the generated digital video data to the display unit 220. The display unit 220 outputs the input digital video data as visual information. The display unit 220 can further include a memory for temporarily storing the input digital video data for output.

In step S350, the image processor 210 judges whether the reproduction of images is completed. For example, the image processor 210 can judge that the reproduction of images is completed when the image processor 210 does not input the digital video data any more.

When it is judged in step 350 the reproduction of images is not completed, the process of step 320 is performed again. However, when it is judged that the reproduction of images is completed, the flow of processes is ended. Thereafter, when the reproduction of new image information is started, it is obvious that the processes subsequent to step 310 or 320 are performed.

As described above, the display system and the method of outputting an image signal corresponding to a display panel according to the invention can adaptively cope with the replacement of only a display panel for the purpose of improvement in resolution, etc.

It is possible to receive proper information on the output standard from the display panel.

Although the invention has been described with reference to the exemplary embodiments, it will be understood by those skilled in the art that the invention can be modified and changed in various forms without departing from the spirit and the scope of the appended claims.

What is claimed is:

1. A display system comprising:

an interface configured to couple the display system to a plurality of different display units one at a time, each of the plurality of different display units having at least one display characteristic that is different from a corresponding display characteristic of other display units among the plurality of different display units, and the at least one display characteristic including at least one of a resolution, a screen ratio, and a vertical frequency corresponding to the respective display unit of the plurality of different display units; and an image processor configured to:

monitor the interface to determine whether one of the plurality of different display units has been replaced based on a reset of a circuit connection of the interface;

determine whether a particular display unit comprises a non-volatile memory that stores the at least one display characteristic, the particular display unit being a display unit from among the plurality of different display units that is coupled to the display system via the interface;

read the at least one display characteristic from the memory of the particular display unit through the interface of the display system if it is determined that the particular display unit comprises the non-volatile memory that stores the at least one display characteristic;

determine an output standard with which a video signal is to be output to the particular display unit based on the at least one display characteristic if the at least one display characteristic is read from the memory of the particular display device;

automatically update the image processor to use the output standard with which the video signal is to be output to the particular display unit;

convert original video data that is received from a video signal converting unit into converted video data corresponding to the output standard if the output standard is determined based on the at least one display characteristic; and output the converted video data to the particular display unit if the original video data is converted, wherein the image processor is configured to read out the at least one display characteristic from the memory of the particular display unit at the time of first coupling the interface to the particular display.

2. A display system comprising:

an interface configured to couple the display system to a plurality of different display units one at a time, each of the plurality of different display units having at least one display characteristic that is different from a corresponding display characteristic of other display units among the plurality of different display units, and the at least one display characteristic including at least one of a resolution, a screen ratio, and a vertical frequency corresponding to the respective display unit of the plurality of different display units; and an image processor configured to:

monitor the interface to determine whether one of the plurality of different display units has been replaced based on a reset of a circuit connection of the interface;

determine whether a particular display unit comprises a non-volatile memory that stores the at least one display characteristic, the particular display unit being a display unit from among the plurality of different display units that is coupled to the display system via the interface;

read the at least one display characteristic from the memory of the particular display unit through the interface of the display system if it is determined that the particular display unit comprises the non-volatile memory that stores the at least one display characteristic;

determine an output standard with which a video signal is to be output to the particular display unit based on the at least one display characteristic if the at least one display characteristic is read from the memory of the particular display device;

automatically update the image processor to use the output standard with which the video signal is to be output to the particular display unit;

convert original video data input that is received from a video signal converting unit into converted video data corresponding to the output standard if the output standard is determined based on the at least one display characteristic; and output the converted video data to the particular display unit if the original video data is converted, wherein the image processor is configured to read out the at least one display characteristic from the memory of the particular display unit at the time of first receiving continuous original video data from the video signal converting unit.

3. A method of outputting an image signal from an image processor in a display system that is coupled to a display unit via an interface, the method comprising:

(a) monitoring the interface to determine whether a first display unit coupled to the display system has been replaced with a second display unit based on a reset of a circuit connection of the interface;

(b) determining that the second display unit comprises a non-volatile memory that stores at least one display characteristic, the at least one display characteristic, the at least one display characteristic including at least one of a resolution, a screen ratio, and a vertical frequency corresponding to the second display unit;

(c) reading out the at least one display characteristic from the memory of the second display unit;

(d) determining an output standard with which a video signal is to be output to the second display unit based on the at least one display characteristic;

(e) automatically updating the display system to use the output standard with which the video signal is to be output to the second display unit;

(f) receiving original video data from a video signal converting unit;

(g) converting the original video data into converted video data corresponding to the output standard; and (h) outputting the converted video data to the second display unit, wherein steps (b) through (d) are performed only when the second display unit is first coupled to the video signal converting unit.

4. The method according to claim 3, wherein:

the interface comprises one or more pins, and the step of determining that the second display unit comprises the non-volatile memory comprises determining that the second display unit comprises the one or more pins.

5. A method of outputting an image signal from an image processor in a display system coupled to a display unit via an interface, the method comprising:

(a) monitoring the interface to determine whether a first display unit coupled to the display system has been replaced with a second display unit based on a reset of a circuit connection of the interface;

(b) determining that the second display unit comprises a non-volatile memory that stores at least one display characteristic;

(c) reading out the at least one display characteristic from the memory of the second display unit;

(d) determining an output standard with which a video signal is to be output to the second display unit based on the at least one display characteristic, the at least one display characteristic including at least one of a resolution, a screen ratio, and a vertical frequency corresponding to the second display unit;

(e) automatically updating the display system to use the output standard with which the video signal is to be output to the second display unit;

(f) receiving original video data from a video signal converting unit;

(g) converting the original video data into converted video data corresponding to the output standard;

(h) outputting the converted video data to the second display unit, wherein steps (b) through (d) are performed only when continuous original video data is first received from the video signal converting unit.

6. The display system according to claim 1, wherein:

the interface comprises one or more pins; and the image processor is configured to determine whether the particular display unit comprises the non-volatile memory by determining whether the display unit comprises the one or more pins.

7. The display system according to claim 1, wherein the image processor is configured to select a default standard as the output standard if it is determined that the particular display unit does not comprise the non-volatile memory that stores the at least one display characteristic.

8. The display system according to claim 1, wherein, when at least one other unit from among the plurality of different display units is coupled to the display system, the image processor is configured to:

determine whether the at least one other display unit comprises a non-volatile memory that stores the at least one display characteristic;

read the at least one display characteristic from the memory of the at least one other display unit through the interface of the display system if it is determined that the at least one other display unit comprises the non-volatile memory that stores the at least one display characteristic; and determine an output standard with which a video signal is to be output to the at least one other display unit based on the at least one display characteristic if the at least one display characteristic is read from the memory of the at least one other display device, wherein the output standard for the at least one other display unit is determined to be different than the output standard determined for the particular display unit based on the at least one display characteristic read from the memory of the at least one other display device.

9. The display system according to claim 2, wherein:

the interface comprises one or more pins; and the image processor is configured to determine whether the particular display unit comprises the non-volatile memory by determining whether the display unit comprises the one or more pins.

10. The display system according to claim 2, wherein the image processor is configured to select a default standard as the output standard if it is determined that the particular display unit does not comprise the non-volatile memory that stores the at least one display characteristic.

11. The display system according to claim 1, wherein, when at least one other unit from among the plurality of different display units is coupled to the display system, the image processor is configured to:

determine whether the at least one other display unit comprises a non-volatile memory that stores the at least one display characteristic;

read the at least one display characteristic from the memory of the at least one other display unit through the interface of the display system if it is determined that the at least one other display unit comprises the non-volatile memory that stores the at least one display characteristic; and determine an output standard with which a video signal is to be output to the at least one other display unit based on the at least one display characteristic if the at least one display characteristic is read from the memory of the at least one other display device, wherein the output standard for the at least one other display unit is determined to be different than the output standard determined for the particular display unit based on the at least one display characteristic read from the memory of the at least one other display device.

12. The method according to claim 5, wherein:

the interface comprises one or more pins, and the step of determining that the second display unit comprises the non-volatile memory comprises determining that the second display unit comprises the one or more pins.

13. The method according to claim 3, wherein:

steps (a) through (e) are repeated for a different display unit that comprises a non-volatile memory that stores at least one display characteristic; and the at least one display characteristic read out from the memory of the different display unit at step (c) is different from the at least one display characteristic previously read out at step (c); and the output standard for the different display unit determined at step (d) is different from the output standard determined previously at step (d).

14. The method according to claim 5, wherein:

steps (a) through (d) are repeated for a different display unit that comprises a non-volatile memory that stores at least one display characteristic; and the at least one display characteristic read out from the memory of the different display unit at step (c) is different from the at least one display characteristic previously read out at step (c); and the output standard for the different display unit determined at step (d) is different from the output standard determined previously at step (d).

* * * * *